US007616936B2

(12) United States Patent
Shaffer et al.

(10) Patent No.: US 7,616,936 B2

(45) Date of Patent: Nov. 10, 2009

(54) PUSH-TO-TALK SYSTEM WITH ENHANCED NOISE REDUCTION

(75) Inventors: Shmuel Shaffer, Palo Alto, CA (US); Michael P. O'Brien, Manasquan, NJ (US)

(73) Assignee: Cisco Technology, Inc., San Jose, CA (US)

( * ) Notice: Subject to any disclaimer, the term of this patent is extended or adjusted under 35 U.S.C. 154(b) by 510 days.

(21) Appl. No.: 11/610,596

(22) Filed: Dec. 14, 2006

(65) Prior Publication Data

US 2008/0147392 A1 Jun. 19, 2008

(51) Int. Cl.
*H04B 1/00* (2006.01)

(52) U.S. Cl. ....................... 455/283; 455/296; 455/307; 455/518; 455/63.1

(58) Field of Classification Search ................. 455/518, 455/67.13, 67.11, 67.12, 67.16, 550.1, 283, 455/284, 90.3, 423, 63.1, 307; 704/226, 704/227, 228, 233, 500; 381/94.1, 94.3, 381/101, 74, 151
See application file for complete search history.

(56) References Cited

U.S. PATENT DOCUMENTS 4,905,305 A * 2/1990 Garner et al. ............ 455/183.2
6,647,367 B2 * 11/2003 McArthur et al. ........... 704/226
2004/0203454 A1 * 10/2004 Rogers .................... 455/67.13
2005/0227657 A1 * 10/2005 Frankkila et al. ............ 455/255
2008/0140427 A1 * 6/2008 Rambo et al. ............... 704/500

* cited by examiner

*Primary Examiner*—Tan Trinh
(74) *Attorney, Agent, or Firm*—Peggy A Su

(57) ABSTRACT

Methods and apparatus for reducing the effect of surrounding noise in a push-to-talk (PTT) system are disclosed. In one embodiment, a method includes obtaining a first media stream using a microphone when a PTT functionality of a PTT communications system is in a first state, and identifying a first set of characteristics associated with noise in the first media stream. The method also includes obtaining a second media stream using the microphone that includes the noise and a first sound when the PTT functionality is in a second state. A second set of characteristics associated with the first sound in the second media stream is identified, and parameters associated with a filtering arrangement are determined using the first and second sets of characteristics. Finally, the method includes applying the filtering arrangement to the second media stream to filter out the noise such that a communications stream is created.

20 Claims, 6 Drawing Sheets

PUSH-TO-TALK SYSTEM WITH ENHANCED NOISE REDUCTION

BACKGROUND OF THE INVENTION

The present invention relates generally to push-to-talk (PTT), or push to transmit, systems.

Emergency Response Teams (ERTs) often utilize PTT devices to facilitate their communication. PTT devices, which include two-way radios or other devices which support two-way communications, include buttons that may be engaged to transmit media, e.g., a voice signal or voice data, and disengaged to receive media. Some PTT systems facilitate floor control such that only a single end user may control the floor and send media, while all other end users associated with the system may only listen to the single end user with control of the floor.

As ERT teams often operate in environments which are relatively noisy, communications utilizing PTT devices may be impeded. For example, if an end-user transmits media, surrounding noise is also transmitted. The surrounding noise may include significant noise such as noise from sirens, noise associated with traffic, and noise associated with helicopters and aircraft. When the voice of an end-user is transmitted along with significant noise, a receiver may not be able to determine what message the end-user is trying to convey. Hence, communications using PTT devices may not be efficient in the presence of surrounding noise.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

In one embodiment, a method includes obtaining a first media stream using a microphone when a PTT functionality of a PTT communications system is in a first state, and identifying a first set of characteristics associated with noise in the first media stream. The method also includes obtaining a second media stream using the microphone that includes the noise and a first sound when the PTT functionality is in a second state. A second set of characteristics associated with the first sound in the second media stream is identified, and parameters associated with a filtering arrangement are determined using the first and second sets of characteristics. Finally, the method includes applying the filtering arrangement to the second media stream to filter out the noise such that a communications stream is created.

Description

By reducing the effect of surrounding noise on a transmission of a voice of a speaker or an end user using a push-to-talk (PTT) device by modifying either a transmitting path or a receiving path, communications using PTT devices may be enhanced. The voice characteristics of the speaker are captured when the PTT function of the PTT device is engaged, and surrounding noise characteristics are captured when the PTT function is not engaged. Both voice characteristics and noise characteristics may be captured in a media signal while the PTT function is engaged. Hence, knowledge of what the surrounding noise characteristics are when the speaker is not speaking, e.g., when the PTT function is not engaged, allows a filter to be designed to filter out the noise characteristics from the media signal such that the effect of surrounding noise may be reduced.

In one embodiment, a single microphone such as one intended to capture the voice of a speaker or an end user may be used in an intelligent, time-multiplexed manner. When a PTT function of a PTT device is engaged and the speaker speaks, the microphone captures both the voice of the speaker and surrounding noise. If the PTT function is not engaged and the speaker is not speaking, the microphone captures surrounding noise. Hence, when the PTT function is engaged, speaker voice characteristics may be collected. Surrounding noise characteristics may be collected when the PTT function is not engaged.

Figure 1:
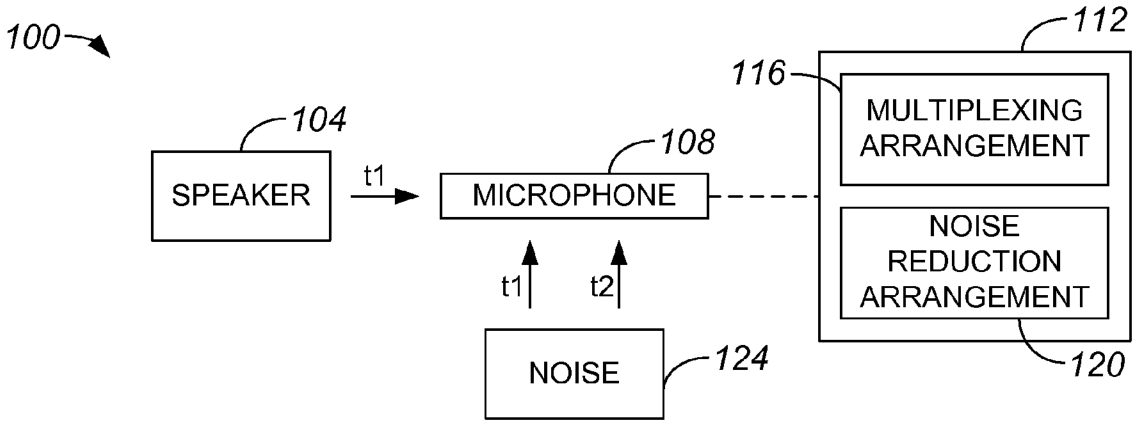
FIG. 1 is a block diagram representation of a system in which a time-multiplexed microphone captures characteristics of a speaker and characteristics of noise in accordance with an embodiment of the present invention.

Referring initially to FIG. 1, the use of a time-multiplexed microphone to capture surrounding noise both with and without the voice of a speaker will be described in accordance with an embodiment of the present invention. Within a system 100, e.g., a PTT communications system, a speaker or end user 104 may speak into a microphone 108 when a PTT functionality associated with microphone 108 is engaged. By way of example, if microphone 108 is part of a PTT device (not shown), when the PTT functionality of the PTT device is engaged, speaker 104 may speak into microphone 108.

Coupled to microphone 108 is a control subsystem 112 which provides multiplexing and noise reduction. A multiplexing arrangement 116 allows microphone 108 to be used in a time-multiplexed manner, while a noise reduction arrangement 120 generates a filter that allows surrounding noise 124 to be filtered out of media streams associated with a voice of speaker 104. Multiplexing arrangement 116 may further be arranged to allow microphone 108 to remain on or active even when PTT functionality is not engaged. In general, control subsystem 112 may either be located at a core of system 100 or at an endpoint or PTT device of system 100.

At a time t1, when the PTT functionality associated with microphone 108 is engaged or is in a first state, a voice of speaker 104 as well as surrounding noise 124 may be captured by microphone 108. At a time t2, when the PTT functionality associated with microphone 108 is not engaged or is in a second state, surrounding noise 124 is still captured by microphone 108. Capturing noise 124 and/or a voice of speaker 104 in media streams is generally at least partially controlled by multiplexing arrangement 112. Multiplexing arrangement 116 facilitates the use of microphone 108 to capture the voice of speaker 104 and surrounding noise 124 when PTT functionality is engaged, and to capture surrounding noise 124 when PTT functionality is not engaged. A voice characteristics analyzer 118 cooperates with multiplexer 116 and noise reduction arrangement 120 to analyze the characteristics of the voice of speaker 104 as well as characteristics of surrounding noise 124.

Media streams may be provided to voice characteristics analyzer 118 and to noise reduction arrangement 120 such that characteristics of noise 124 and characteristics of a voice of speaker 104 may be used to generate a filter to reduce noise associated with a transmission of the voice of speaker 104 while substantially minimizing the impact to the media associated with speaker 104. In one embodiment, noise reduction arrangement 120 generates and implements notch filter using parameters which are determined using characteristics of noise 124 and characteristics of the voice of speaker 104.

Figure 2:
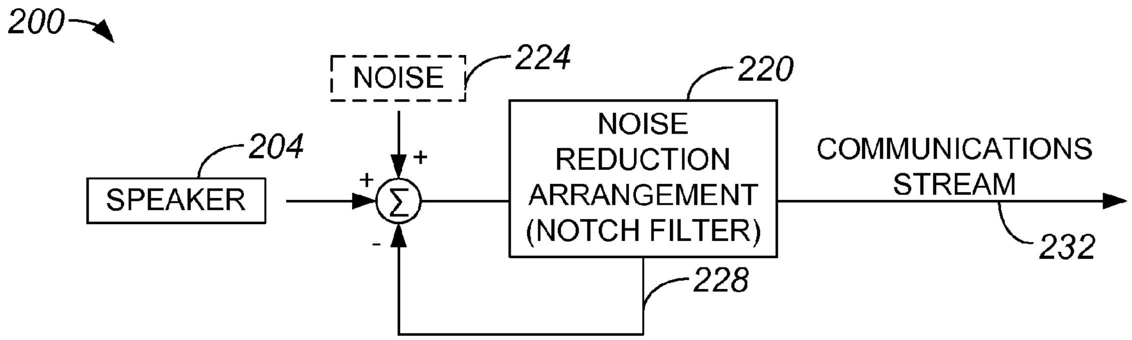
FIG. 2 is a block diagram of a system which includes a noise reduction arrangement that processes a speaker voice and noise in accordance with an embodiment of the present invention.

FIG. 2 is a block diagram which illustrates a control system that may be used to generate a communications stream, or an output voice stream, from input media streams that include surrounding noise in accordance with an embodiment of the present invention. A system 200 includes a noise reduction arrangement 220, which may include a notch filter in one embodiment. Noise reduction arrangement 220 may execute an adaptive noise reduction algorithm, and may be arranged to use parameters determined using characteristics of noise 224 to allow a voice of a speaker 204 to be transmitted as a communications stream 232 in which the presence of corrupting noise 224 has been reduced. In other words, noise reduction arrangement 220 uses characteristics of noise 224 obtained when the PTT functionality of a PTT device is not engaged to filter out, e.g., effectively cancel out, noise from a media stream that is obtained when the PTT functionality is engaged.

When noise reduction arrangement 220 includes a notch filter, characteristics of noise 224 that are obtained when the PTT functionality of a PTT device is not engaged, may be used to substantially prevent noise 224 from being included in communications stream 232. That is, a notch filter may block out certain noise frequencies from being included in communications stream 232 such that a voice of speaker 204 is transmitted without significant corruption from noise 224.

Figure 3:
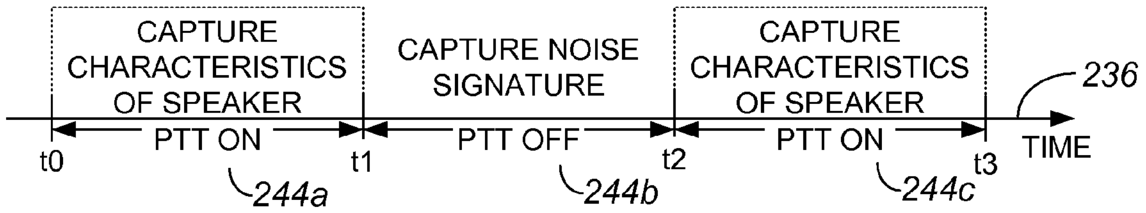
FIG. 3 is a diagrammatic representation of a timeline which indicates when speaker characteristics and noise characteristics are captured in accordance with an embodiment of the present invention.

FIG. 3 is a timeline which indicates the type of data is intended to be collected from a media stream depending upon whether the PTT functionality of a PTT device is activated or deactivated in accordance with an embodiment of the present invention. A timeline 236 indicates intervals 244*a*-244*c* in which the PTT functionality of a PTT device is activated or deactivated, e.g., engaged or disengaged. During intervals 244*a* and 244*b*, the PTT functionality of the PTT device is activated, and the speaker is speaking. Hence, characteristics of the speaker or, more specifically, characteristics of the voice of the speaker may be captured. It should be appreciated that although surrounding noise may corrupt a media signal that includes the voice of the speaker, during intervals 244*a* and 244*b*, the intention is to capture characteristics of the speaker. During interval 244*b*, the PTT functionality of the PTT device is deactivated. As the speaker is generally not speaking into the microphone when the PTT functionality is deactivated, a noise signature or noise characteristics may be captured during interval 244*b*.

Noise may be filtered out of a media stream using an adaptive noise filter at an endpoint, e.g., a PTT device, or at a core processor arrangement of an overall communications system. In other words, the analysis of a media stream that includes the voice of a speaker may occur either at an endpoint of a deployment architecture or at a core of a deployment architecture. "In accordance with one deployment architecture, system 220 of FIG. 2 is embedded in the endpoint. In accordance with this architecture, the endpoint employs the PTT signals and analyzes the media streams both during activated and deactivated PTT functionality. The endpoint then utilizes the media characteristics captured during the time intervals 244*a* and 244*b*, as indicated in FIG. 3, for constructing a notch filter. This filter is used during subsequent time intervals, e.g., time interval 244*c*, for filtering the noise out of the transmitted signal before the signal leaves the endpoint. This architecture is useful when dealing with radio systems because existing radio systems do not allow for the sending of media from endpoints when the PTT is deactivated.

In accordance with a second deployment architecture, system 220 of FIG. 2 is located in the core of a network in a central media server. In accordance with this architecture, the central media server receives the PTT signals as well as the media from the endpoints. The media server analyzes the media streams both during activated and deactivated PTT functionality. The media server then employs the media characteristics captured during time intervals 244*a* and 244*b* of FIG. 3 for constructing a notch filter. This filter is used during the subsequent time intervals, e.g., time interval 244*c*, for filtering the noise out of the transmitted signal from the central media server to all of the endpoints. This architecture is useful when dealing with an internet protocol (IP) Network based PTT systems because existing IP networks have sufficient bandwidth for transmitting media from endpoints to the central media server regardless of whether a PTT state is activated or deactivated.

Figure 4A:
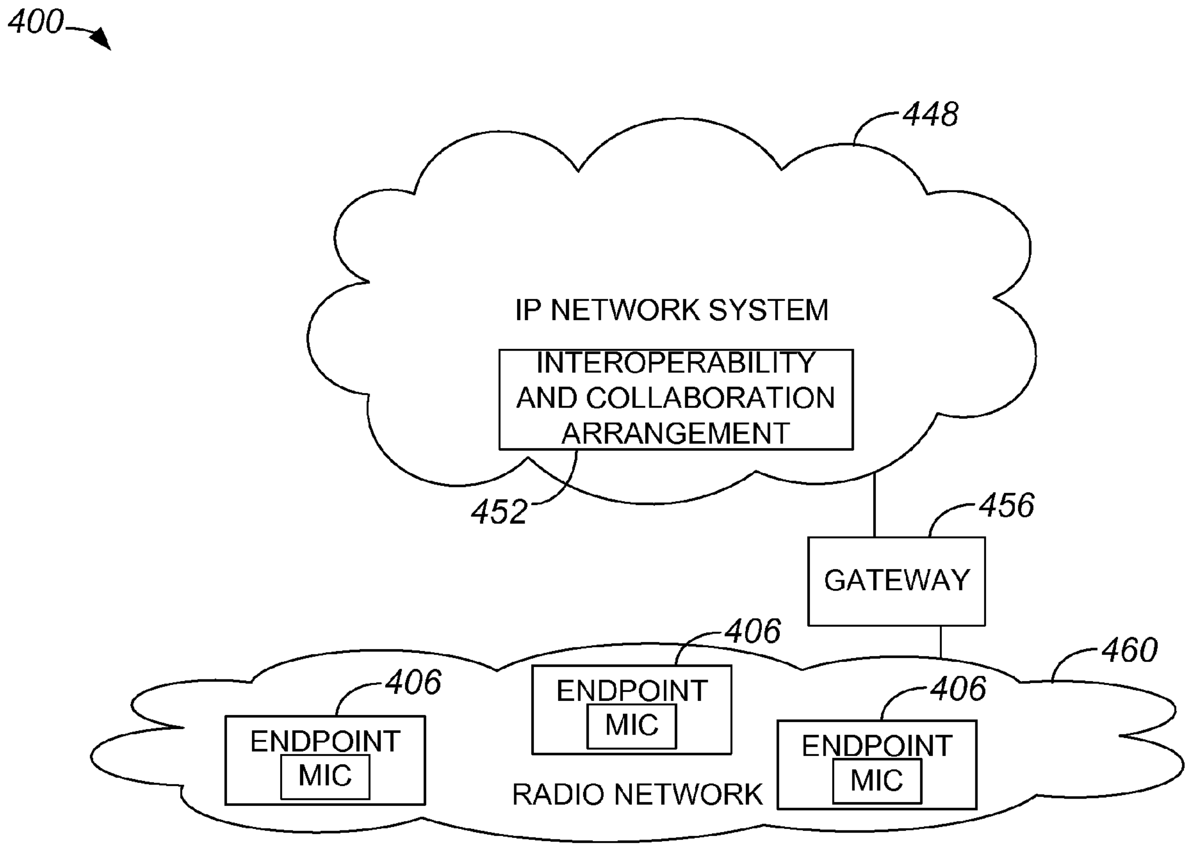
FIG. 4A is a diagrammatic representation of a distributed architecture in which characteristics are captured and analyzed at endpoints in accordance with an embodiment of the present invention.

With reference to FIG. 4A, a system with a distributed deployment architecture in which media streams are captured and analyzed at an endpoint will be described in accordance with an embodiment of the present invention. A system 400 includes an IP network system 448 and a radio network 460 that is in communication with IP network system 448 via a gateway 456. IP network system 448 includes an interoperability and collaboration arrangement 452 that integrates PTT networks, and provides a platform for communications interoperability. IP network system 448 also enables multiple streams to be analyzed via an adaptive noise reduction algorithm and mixed into other communication channels or VTGs. In one embodiment, interoperability and collaboration arrangement 452 is the IP Interoperability and Collaboration System (IPICS) available commercially from Cisco System, Inc. of San Jose, Calif.

Figure 4B:
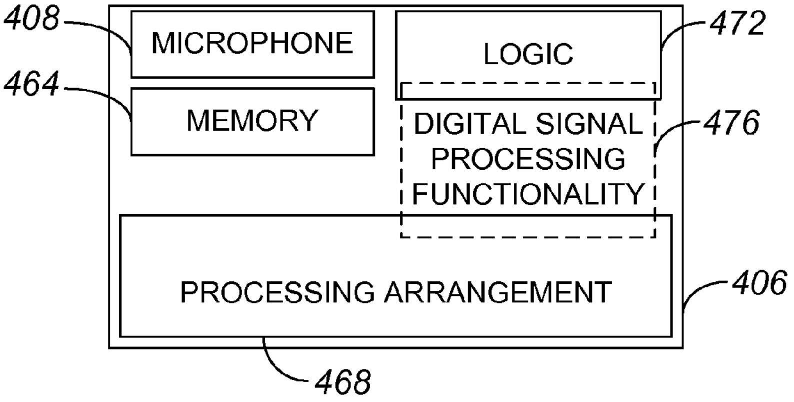
FIG. 4B is a diagrammatic representation of an endpoint, e.g., endpoint 406 of FIG. 4A, in accordance with an embodiment of the present invention.

System 400 includes a plurality of endpoints 406, 408 which may be PTT devices. In one embodiment, endpoints 408, which are located in IP network system may be IP based PTT devices such as a Cisco Push-to-Talk Management Center (PMC) available commercially from Cisco Systems, Inc. of San Jose, Calif. Endpoints 406, 408 however, may instead be computing systems which are in communication with PTT devices. Each endpoint 406, 408 has an associated microphone, and is arranged to both capture and to analyze media signals, e.g., media signals associated with the voice of a speaker and media signals associated with surrounding noise. FIG. 4B is a block diagram representation of an endpoint 406 in accordance with an embodiment of the present invention. Endpoint 406 captures or otherwise analyzes media streams through a microphone 408. Collected media streams, e.g., analog signals or packets included in media streams, may be stored in a memory 464. Logic 472, which may be software logic devices and/or hardware logic devices, may cooperate with a processing arrangement 468 to provide digital signal processing functionality 476. In one embodiment, digital signal processing functionality 476 may be encoded as logic on an executable medium that is executed by processing arrangement 468. Digital signal processing functionality 476 determines the voice signature, or voice characteristics, of a speaker and the noise signature, or noise characteristics. In one embodiment, noise and speaker voice characteristics may be the frequency content of media streams.

Figure 5:
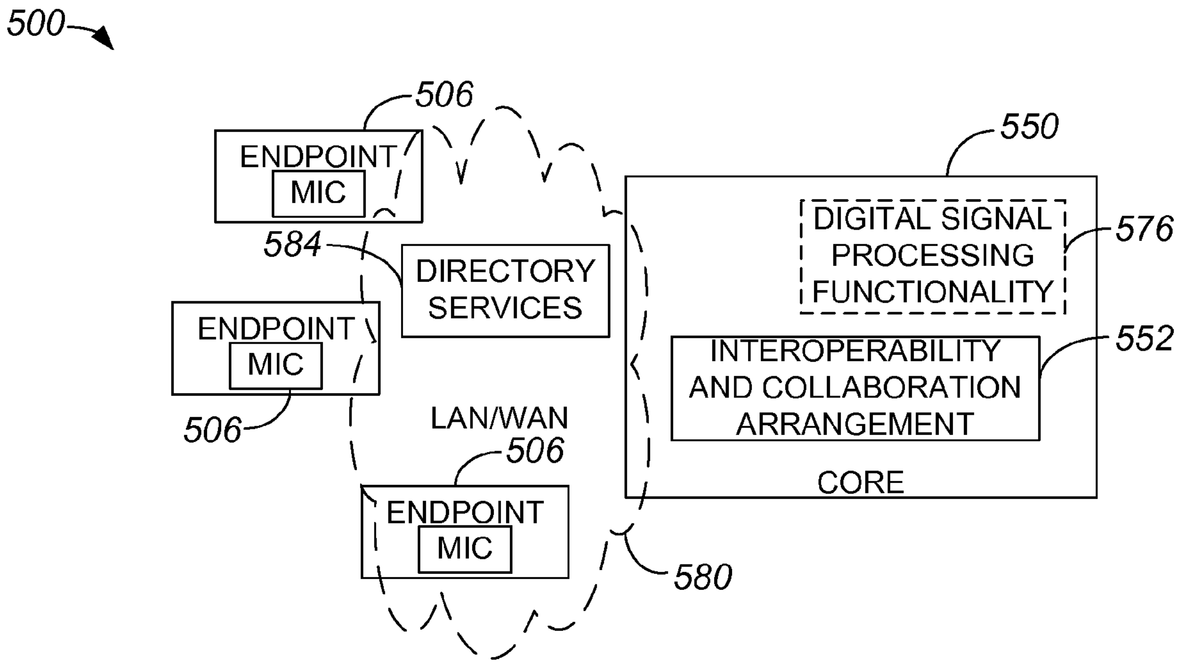
FIG. 5 is a diagrammatic representation of a centric architecture in which captured characteristics are analyzed at a central media server in accordance with an embodiment of the present invention.

In lieu of being located at an endpoint, digital signal processing functionality may be located at the core of a centric or central architecture. FIG. 5 is a diagrammatic representation of a centric architecture in which captured characteristics are analyzed at a core in accordance with an embodiment of the present invention. A system 500 depicts a central media server 550 incorporates an interoperability and collaboration arrangement 552. Digital signal processing functionality 576, of functionality that determines voice and noise signatures of captured media streams, is embodied as logic, e.g., executable logic, within central media server 550.

In one embodiment, central media server 550 is in communication with endpoints 506 through a local area network (LAN) or a wide area network (WAN) 580. Directory 584 is substantially attached to LAN/WAN 580, and provides a mechanism or functionality for storing voice and noise] signatures of the users of system 500. As users logon into system 500, the users may retrieve their specific voice characteristics use them to initiate the calculation of an applicable notch filter before speaking.

Endpoints 506 capture media streams, which are then communicated to central media server 552 such that digital signal processing functionality 576 may be used to determine voice and noise signatures, and to enable noise to be filtered out of media streams that include the voice of a speaker. As system 500 analyzes the media stream of the speakers, System 500 compares the voice characteristics with the characteristics stored in directory 584 and updates them accordingly.

Figure 6:
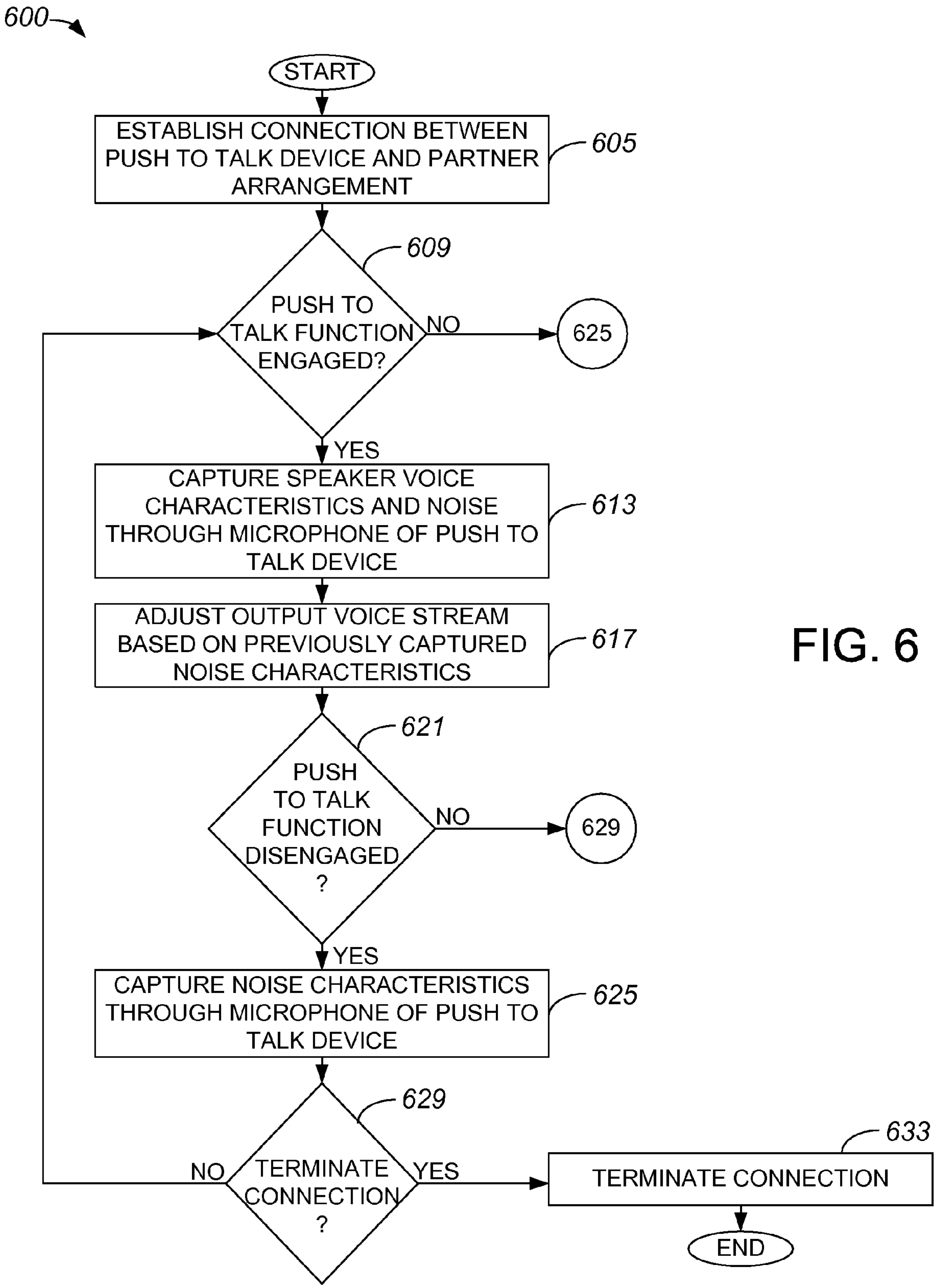
FIG. 6 is a process flow diagram which illustrates a method of utilizing a PTT (PTT) device that has noise reduction capabilities in accordance with an embodiment of the present invention.

With reference to FIG. 6, one method of utilizing a PTT device will be described in accordance with an embodiment of the present invention. A process 600 of utilizing a PTT device begins at step 605 in which a PTT endpoint joins a virtual talk group (VTG). In one embodiment, the PTT device is associated with a VTG which may include a plurality of endpoints, e.g., other PTT devices. In some instances, the VTG may be facilitated by a central media server. It should be appreciated that establishing a connection may include retrieving stored voice characteristics for a speaker who is generally logged into the PTT device. That is, logging into the system and joining a VTG may include substantially initializing the PTT device.

In step 609, a determination is made as to whether the PTT function of the PTT device is engaged, e.g., it is determined if floor control has been granted to a speaker associated with the PTT device who wishes to speak into the PTT device. If it is determined that the PTT function is engaged, the indication is that voice characteristics of the speaker are to be captured. Accordingly, process flow moves to step 613 in which speaker voice characteristics and surrounding noise are captured using a microphone of the PTT device. The media stream that is captured by the microphone generally includes the speech or voice characteristics of the speaker including, but not limited to including, frequency and power, as corrupted by noise. The combined voice and noise characteristics may be stored either on the PTT device or in a central mixing facility.

The output voice stream, or the voice stream that is to be transmitted by the PTT device is adjusted based on previously captured noise characteristics in step 617. In other words, noise is filtered out of the captured media stream using information relating to known noise characteristics. One method of adjusting the output voice stream will be discussed below with reference to FIG. 7. From step 617, process flow proceeds to step 621 in which a filtered media stream is transmitted. After the filtered media stream is transmitted, process flow returns to step 609 in which it is determined if the PTT function of the PTT device is still engaged.

Returning to step 609, if it is determined that the PTT function is not engaged, noise characteristics are captured through the microphone of the PTT device in step 625. The noise characteristics, which may include but are not limited to including frequency and power, relate to the surrounding or ambient noise at the location at which the PTT device is being used. In general, once the noise characteristics are obtained, the noise characteristics may be stored. Methods for capturing noise characteristics will be discussed below with reference to FIGS. 8 and 9.

Once noise characteristics are captured, it is determined in step 629 whether the user has logged out. If it is determined that the user has logged out, the process of utilizing a PTT device is completed. Alternatively, if the determination is that the user had not logged out, process flow returns to step 609 in which it is determined if the PTT functionality of the PTT device is engaged.

Figure 7:
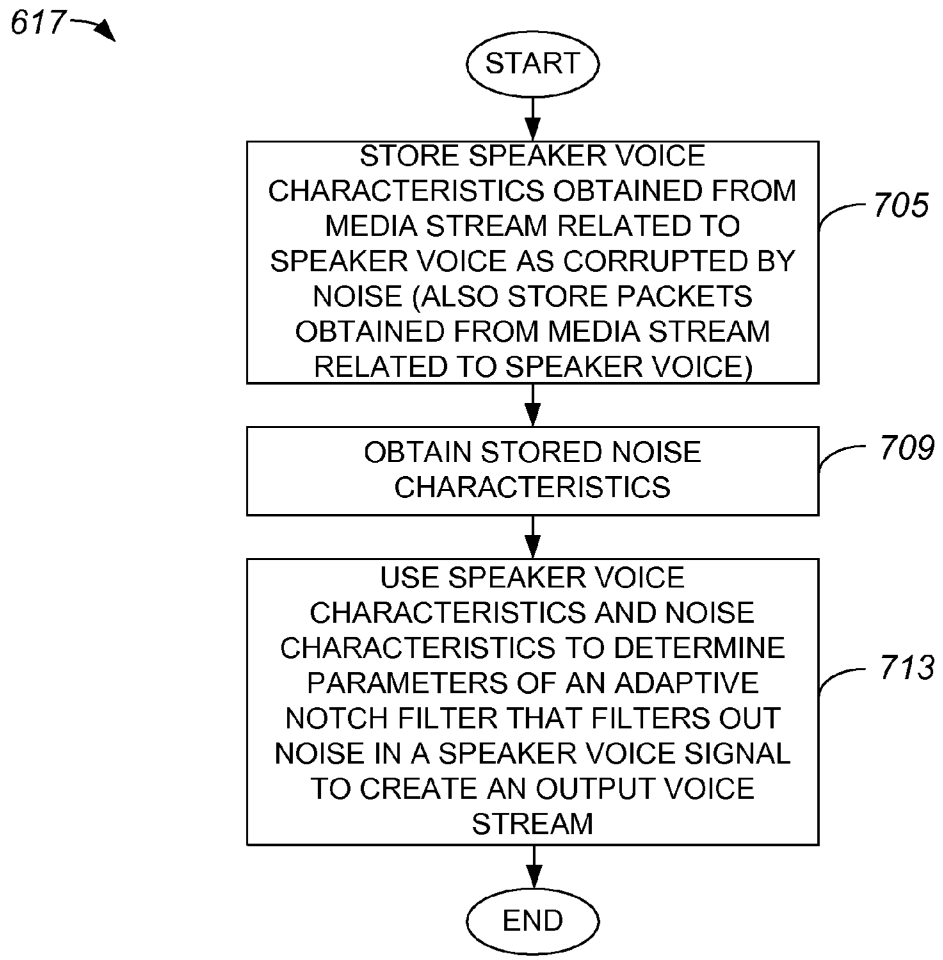
FIG. 7 is a process flow diagram which illustrates a method of adjusting an output voice stream using previously captured characteristics, e.g., step 617 of FIG. 6, in accordance with an embodiment of the present invention.

Referring next to FIG. 7, one method of adjusting an output voice stream based on previously captured noise characteristics, e.g., step 617 of FIG. 6, will be described in accordance with an embodiment of the present invention. A process 617 of adjusting an output voice stream based on previously captured noise characteristics begins at step 705 in which the characteristics of the combined speaker voice and surrounding noise are analyzed by DSP function 576 of FIG. 5 and stored either locally in the endpoint or in directory 584 during time interval 244*a* of FIG. 3. The speaker voice characteristics are obtained from a media stream that includes the speaker voice as corrupted by noise. Typically, packets obtained from the media stream may also be stored.

After the characteristics of the combined speaker voice and surrounding noise are obtained and stored, noise characteristics are obtained in step 709, e.g., during time interval 244*b* of FIG. 3. The noise characteristics are generally those characteristics that are captured when the PTT functionality of a PTT device is not engaged. Stored noise characteristics may be obtained from a storage medium within the PTT device, or from a storage medium within an overall system of which the PTT device is a part. It should be appreciated that voice characteristics of a speaker may be stored as the characteristics may remain approximately the same between speaking sessions. Once the noise characteristics are obtained in step 709, the speaker voice characteristics and the noise characteristics are used to determine parameters of a notch filter that filters out surrounding noise in a speaker voice signal such than an output voice stream is created. In other words, either the PTT device or the overall system of which the PTT device is a part creates an adaptive filter such as a notch filter to filter surrounding noise out of a media stream that includes the speaker voice. Parameters for the notch filter are determined using the speaker voice characteristics and the noise characteristics, and may include, but are not limited to, gains as well as parameters that determine the frequencies that are to be filtered out. The process of adjusting an output voice stream is completed after parameters of a notch filter, e.g., an adaptive notch filter, are determined.

As mentioned above with respect to FIG. 6, methods used to capture the characteristics of the combined speaker voice and surrounding noise" using a time-multiplexed microphone may vary. One method that involves obtaining noise characteristics substantially continuously from a media stream when the PTT functionality of a PTT device is not engaged will be described with respect to FIG. 8. A method of capturing noise characteristics that involves determining a likelihood that the characteristics captured from a media stream are indeed noise characteristics will be discussed below with reference to FIG. 9.

Figure 8:
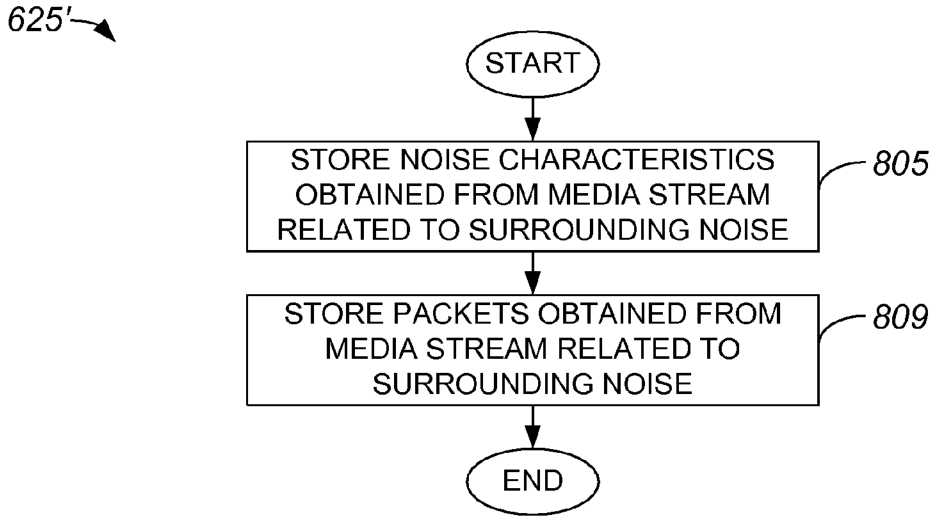
FIG. 8 is a process flow diagram which illustrates a first method of capturing noise characteristics in accordance with an embodiment of the present invention.

FIG. 8 is a process flow diagram which illustrates a method of capturing the characteristics of surrounding noise substantially continuously from a media stream when the PTT functionality of a PTT device is not engaged in accordance with an embodiment of the present invention. A process 625' of capturing noise characteristics begins at step 805 in which noise characteristics obtained from a media stream that is associated with surrounding noise are analyzed and captured. Once the noise characteristics are stored, the packets from which the noise characteristics were determined are conveyed in step 809 such that they may be utilized to construct a notch filter. By way of example, packets may be conveyed such that step 713 of FIG. 7, which involves using noise characteristics to determine parameters of a notch filter, may be executed. After the packets are conveyed, the process of capturing noise characteristics is completed.

Figure 9:
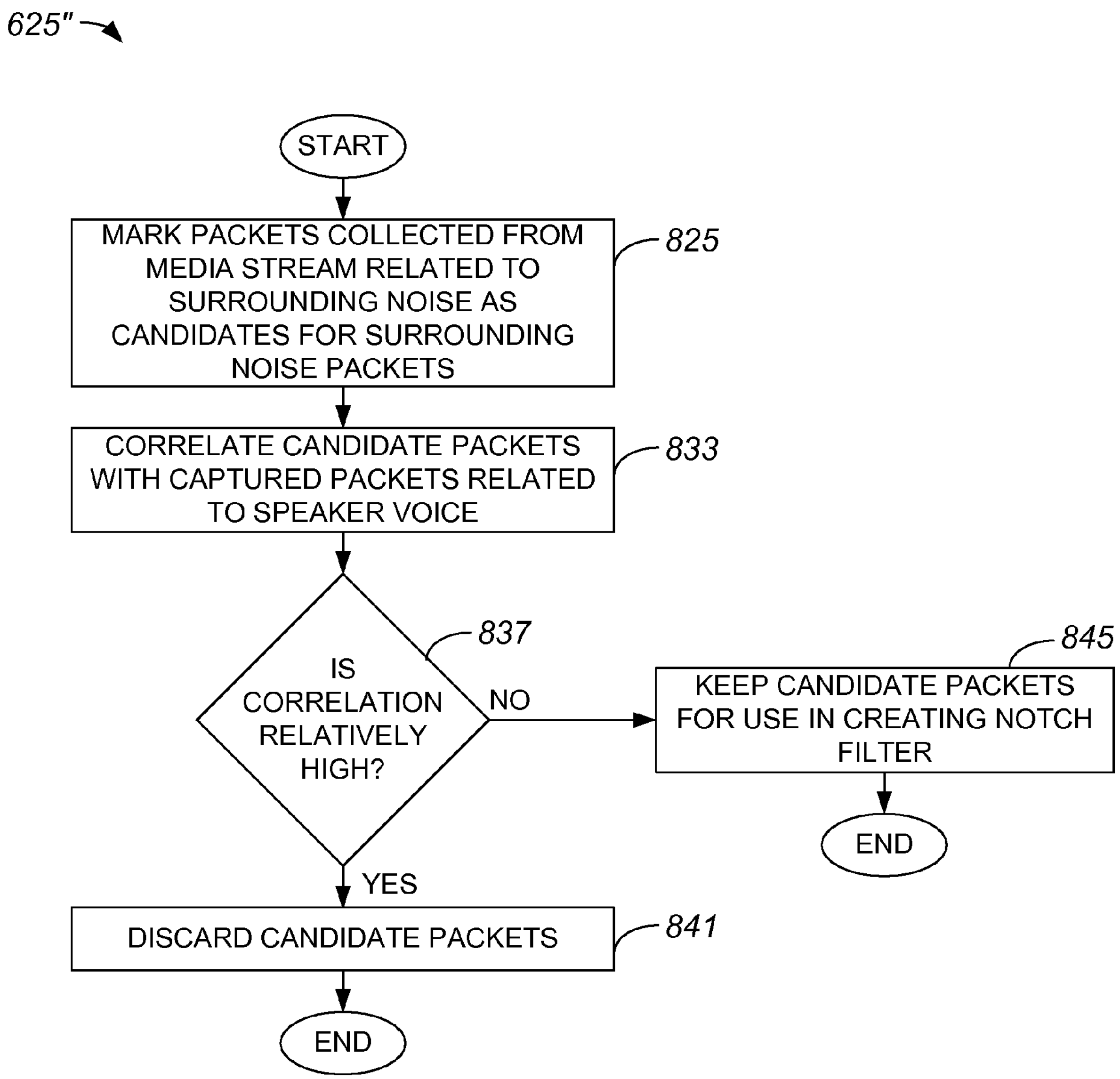
FIG. 9 is a process flow diagram which illustrates a second method of capturing noise characteristics in accordance with an embodiment of the present invention.

FIG. 9 is a process flow diagram which illustrates a method of capturing noise characteristics that involves determining a likelihood that the characteristics captured from a media stream are indeed noise characteristics in accordance with an embodiment of the present invention. A process 625" of capturing noise characteristics begins at step 825 in which packets collected from a media stream associated with surrounding noise, e.g., a media stream collected when the PTT functionality of a PTT device is not engaged, are marked as candidates for surrounding noise packets. The packets are marked as candidates because the packets may include speaker voice characteristics, and may not be purely surrounding noise. By way of example, a speaker may release the PTT functionality on his or her PTT device, and then proceed to speak with people at his location. As a result, the media stream that is gathered may not be candidates for surrounding noise packets because speaker voice characteristics may be included in the media stream.

After the packets are collected from the media stream associated with surrounding noise, the candidate packets are correlated to captured packets associated with speaker voice characteristics in step 833. In other words, the candidate packets collected when the PTT functionality is released are compared to packets that were collected when the PTT functionality was previously engaged. Any suitable method may be employed to correlate the candidate packets with the captured packets associated with speaker voice characteristics.

A determination is made in step 837 as to whether the parameters of the candidate packets and the parameters of the captured packets associated with speaker voice characteristics exhibit common characteristics. For example, the system may determine if the two media streams possess overlapping frequency spectrums and identify frequency components which exist substantially only in the media stream received when the PTT function is engaged.

If it is determined that the parameters collected during the time interval of time the PTT is engaged and during the time interval the PTT is not engaged are similar, the implication is that the candidate packets likely contain the speaker voice and may not be used as surrounding noise packets. In one example embodiment, if the system may not identify a frequency spectrum which is unique to the media stream which is received when the PTT function is engaged, the system concludes that both media streams contain the speaker's voice. As such, in step 841, the candidate packets are discarded, and it is determined in step 849 whether PTT functionality is engaged. If it is determined that PTT functionality is engaged, the process of capturing noise characteristics is completed. Alternatively, if PTT functionality is determined not to be engaged, the indication is that a speaker is not speaking and that candidate packets may include noise characteristics. As such, process flow moves from step 849 to step 825 in which packets collected from a media stream are marked as candidates for surrounding noise packets.

Alternatively, if it is determined in step 837 that the overlap between the parameters is not relatively high, then the indication is that the candidate packets are suitable for use as surrounding noise packets. Therefore, process flow moves from step 837 to step 845 in which the candidate packets are analyzed for determining the noise characteristics and creating an appropriate filter to notch out the surrounding noise that is present in packets that include speaker voice characteristics.

Once the candidate packets are analyzed for noise packets and noise characteristics are extracted, it is determined in step 849 whether PTT functionality is engaged. It should be appreciated that if PTT functionality is engaged, then candidate packets are not collected, as the packets collected while PTT functionality is engaged are packets that include the voice of a speaker. If the determination is that PTT functionality is not engaged, process flow returns to step 825 in which collected packets are marked. Alternatively, if it is determined that PTT functionality is engaged, and the process of capturing noise characteristics is completed.

Although only a few embodiments of the present invention have been described, it should be understood that the present invention may be embodied in many other specific forms without departing from the spirit or the scope of the present invention. By way of example, the voice characteristics of each speaker or end user who may use a PTT device associated with a system may be stored either at an endpoint or end device, or at a directory which is attached to the network. If voice characteristics of a speaker are stored, when the speaker joins a VTG using a PTT device, the system may download the stored voice characteristics for use as a starting point for determining parameters of an adaptive filter for use in notching out noise from a media stream that carries the voice or the speech of the speaker and the surrounding noise. In one embodiment, voice characteristics may be stored at an endpoint. However, voice characteristics may also be stored in a central directory of the system attached to the network.

A filter that may be created to filter out noise from a media stream that carries the speech of a speaker or end user has been described as being a notch filter. Other filters may be implemented for use in filtering out noise. For instance, substantially any band-stop or band-rejection filter with a relatively narrow stopband may be implemented in lieu of a notch filter.

In general, a PTT device may include a hardware or soft button or similar mechanism that is pushed to engage PTT functionality and released to disengage PTT functionality. That is, a PTT device may include a button that is pushed by a speaker when he or she wishes to speak, and is released by the speaker when he or she does not wish to speak. It should be appreciated, however, that a variety of different methods may be used to engage and to disengage PTT functionality.

The present invention has generally been described as being deployed on either an endpoint or a core of a central media server. The invention, however, is not limited to being used in such deployment architectures. By way of example, the present invention may be implemented as a hybrid deployment architecture wherein some services of the system are located at the endpoint while other are located at the central media server without departing from the spirit or the scope of the present invention. Further, it should be understood that in other embodiments, the noise reduction components may reside in the receiving endpoints or may be distributed among any combination of a transmitting endpoint, a receiving endpoint, and a component attached to a LAN/WAN network.

PTT devices or endpoints may be widely varied. In other words, devices which support PTT functionality may be widely varied. For example, PTT devices may include, but are not limited to, land mobile radios, walkie-talkie devices, and a PTT Management Center (PMC) client available commercially from Cisco Systems, Inc.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:

obtaining a first media stream using a microphone associated with a push-to-talk (PTT) communications system, wherein the first media stream is obtained when a PTT functionality of the PTT communications system is in a first state;

identifying a first set of characteristics associated with noise in the first media stream;

obtaining a second media stream using the microphone, wherein the second media stream is obtained when the PTT functionality is in a second state and includes the noise and a first sound;

identifying a second set of characteristics associated with the first sound in the second media stream;

adjusting parameters associated with a filtering arrangement using the first set of characteristics and the second set of characteristics; and applying the filtering arrangement to the second media stream, wherein the filtering arrangement is arranged to filter out the noise from the second media stream to create a communications stream.

2. The method of claim 1 wherein the filtering arrangement includes an adaptive notch filter.

3. The method of claim 1 wherein the first state is a disengaged state and the second state is an engaged state.

4. The method of claim 1 further including:

collecting a first set of packets associated with the first media stream and determining first set of parameters associated first set of packets;

collecting a second set of packets associated with the second media stream and determining second set of parameters associated second set of packets;

determining if the first set of parameters and the second set of parameters exhibit that the first media stream and the second media stream possess different characteristics; and identifying the first set of packets as being associated with the noise if the first set of parameters and the second set of parameters are determined to possess the different characteristics.

5. An apparatus comprising:

a receiver, the receiver being arranged to obtain a first media stream during a first time interval and a second media stream during a second time interval;

an analyzer, the analyzer being arranged to analyze the first media stream to determine noise characteristics, the analyzer further being arranged to analyze the second media stream to determine speaker-related characteristics; and a filter generator, the filter generator being arranged to create a filter using the noise characteristics and the speaker-related characteristics, the filter generator further being arranged to apply the filter to the second media stream to create a communications stream.

6. The apparatus of claim 5 wherein the first media stream includes surrounding noise and the second media stream includes the surrounding noise and a speaker sound, and the filter generator applies the filter to the second media stream to remove at least some of the surrounding noise to create the communications stream.

7. The apparatus of claim 6 wherein the filter is a notch filter.

8. The apparatus of claim 5 wherein the first time interval is an interval in which a push-to-talk (PTT) functionality is disengaged and the second time interval is an interval in which the PTT functionality is engaged.

9. The apparatus of claim 5 wherein the receiver is a microphone, the microphone being arranged to obtain the first media stream and the second media stream by capturing the first media stream and the second media stream.

10. The apparatus of claim 5 wherein the analyzer is further arranged to obtain a first set of packets associated with the first media stream and a second set of packets associated with the second media stream, and to determine if the first media stream and the second media stream possess different characteristics.

11. The apparatus of claim 10 wherein the analyzer determines the noise characteristics if an overlap between the first set of voice characteristics and the second set of voice characteristics is relatively high.

12. The apparatus of claim 11 wherein the voice parameters are the frequency spectrum of the corresponding signals.

13. The apparatus of claim 10 wherein the analyzer is arranged to store the speaker-related characteristics, the speaker-related characteristics being voice characteristics of the speaker.

14. An apparatus comprising:

means for analyzing a first media stream obtained during a first time interval by a microphone to determine noise characteristics;

means for analyzing a second media stream obtained during a second time interval by the microphone to determine speaker-related characteristics;

means for creating a filter using the noise characteristics and the speaker-related characteristics; and means for applying the filter to the second media stream to create a communications stream.

15. The apparatus of claim 14 wherein the first media stream includes surrounding noise and the second media stream includes the surrounding noise and a speaker sound, and apparatus further includes means for applying the filter to the second media stream to remove at least some of the surrounding noise to create the communications stream.

16. The apparatus of claim 15 wherein the filter is a notch filter.

17. The apparatus of claim 14 wherein the first time interval is an interval in which a push-to-talk (PTT) functionality is disengaged and the second time interval is an interval in which the PTT functionality is engaged.

18. The apparatus of claim 14 further including means for capturing the first media stream and the second media stream.

19. The apparatus of claim 14 further including:

means for obtaining a first set of packets associated with the first media stream;

means for obtaining a second set of packets associated with the second media stream; and means for determining if the first media stream and the second media stream possess different characteristics.

20. The apparatus of claim 19 further including means for determining the noise characteristics if an overlap between the first set of voice characteristics and the second set of voice characteristics is relatively high.

* * * * *